(12) United States Patent
Chang (10) Patent No.: US 8,472,072 B2
(45) Date of Patent: Jun. 25, 2013

(54) METHOD FOR IMPROVING PRINTING QUALITY AND RELATED PRINTING SYSTEM

(75) Inventor: Chun-Yu Chang, Hsinchu (TW)

(73) Assignee: Aetas Technology Incorporated, Arcadia, CA (US)

( * ) Notice: Subject to any disclaimer, the term of this patent is extended or adjusted under 35 U.S.C. 154(b) by 689 days.

(21) Appl. No.: 12/731,120

(22) Filed: Mar. 24, 2010

(65) Prior Publication Data

US 2011/0235068 A1    Sep. 29, 2011

(51) Int. Cl.
*G06K 15/00* (2006.01)
*G06F 3/12* (2006.01)
*B41J 2/01* (2006.01)

(52) U.S. Cl.
USPC ............ 358/1.8; 358/1.15; 358/1.1; 347/1

(58) Field of Classification Search
None
See application file for complete search history.

(56) References Cited

U.S. PATENT DOCUMENTS

| 5,805,777 A | 9/1998 | Kuchta | |
|---|---|---|---|
| 6,113,290 A * | 9/2000 | Tanaka et al. | 400/61 |
| 2006/0269342 A1* | 11/2006 | Yoshida et al. | 400/62 |
| 2007/0057996 A1* | 3/2007 | Yazawa et al. | 347/43 |

FOREIGN PATENT DOCUMENTS

TW   200947352   11/2009

* cited by examiner

*Primary Examiner* — Vincent Rudolph
*Assistant Examiner* — Marcus T Riley
(74) *Attorney, Agent, or Firm* — Winston Hsu; Scott Margo (57) ABSTRACT

A method for improving printing quality is disclosed. The method includes an application device transmitting an original image including a plurality of printing pixels to a driving device, the driving device setting the plurality of printing pixels as a plurality of first printing dots, the driving device detecting an edge of the original image, the driving device setting a plurality of second printing dots according to a plurality of neighboring pixels corresponding to the edge, and the driving device generating an image to be printed according to the plurality of first printing dots and the plurality of second printing dots.

21 Claims, 7 Drawing Sheets

METHOD FOR IMPROVING PRINTING QUALITY AND RELATED PRINTING SYSTEM

BACKGROUND OF THE INVENTION

1. Field of the Invention

The present invention relates to a method for improving printing quality and a related printing system, and more specifically, to a method for improving printing quality by adding printing dots and a related printing system.

2. Description of the Prior Art

When a user uses a word processing software (e.g. Word) or a drawing software (e.g. Coreldraw) to control a printing device to print a color image, GDI (Graphics Device Interface) functions provided by a driving program of the printing device, such as an API (Application Programming Interface) for line drawing or word drawing, may be used for generating an image to be printed. However, when the printing device prints a line formed by one single column (or row) of pixels or a word of a small size, the problem of discontinuous printed lines or obscure printed edges may occur due to influence of a halftone process performed on the color image and limiting of electrophotography, so as to reduce the printing quality of the printing device in color-image printing.

On the other hand, when a user uses an application program to control the printing device to print a grayscale image, the application program may directly transmit the processed grayscale image to the driving program instead. At this time, if the grayscale image includes a line formed by one single column (or row) of pixels or a word of a small size, the same problem may also occur as mentioned above so as to reduce the printing quality of the printing device in grayscale-image printing.

Although the said problem may be solved by a method for modifying the electrophotographic setting of the printing device, such as increasing exposure time, this method may cause toner contamination of the printing device easily.

Thus, how to solve the said problem of discontinuous printed lines or obscure printed edges should be a concern for a printing device in color-image printing and grayscale-image printing.

SUMMARY OF THE INVENTION

The present invention provides a method for improving printing quality, the method comprising an application device transmitting an original image comprising a plurality of printing pixels to a driving device; the driving device setting the plurality of printing pixels as a plurality of first printing dots; the driving device detecting an edge of the original image; the driving device setting a plurality of second printing dots according to a plurality of neighboring pixels corresponding to the edge; and the driving device generating an image to be printed according to the plurality of first printing dots and the plurality of second printing dots.

The present invention further provides a printing system for improving printing quality, the printing system comprising an application device for transmitting an original image, the original image being formed by a plurality of printing pixels; a driving device for processing the original image, the driving device comprising an edge detecting unit for detecting an edge of the original image; a printing-dot setting unit for setting the plurality of printing pixels as a plurality of first printing dots and setting a plurality of second printing dots according to a plurality of neighboring pixels corresponding to the edge; and an image generating unit for generating an image to be printed according to the plurality of first printing dots and the plurality of second printing dots; and a printing device for printing the image to be printed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
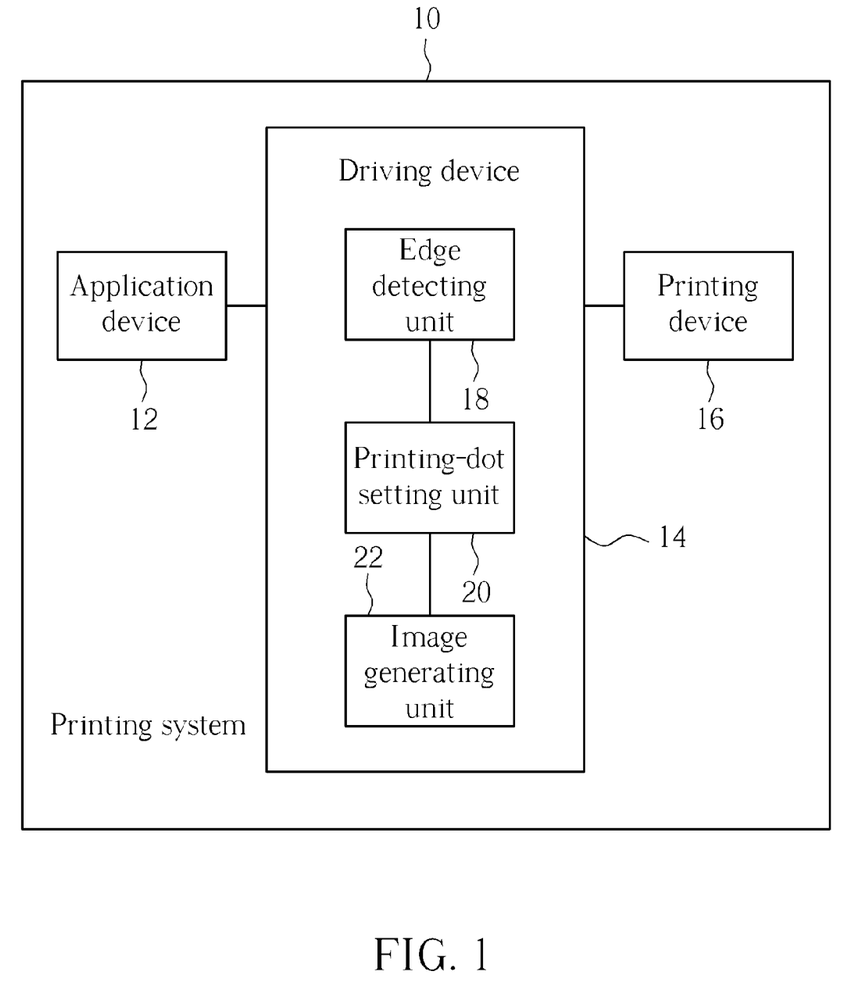
FIG. 1 is a functional block diagram of a printing system according to a preferred embodiment of the present invention.

Please refer to FIG. 1, which is a functional block diagram of a printing system 10 according to a preferred embodiment of the present invention. As shown in FIG. 1, the printing system 10 includes an application device 12, a driving device 14, and a printing device 16. The application device 12 is used for transmitting an original image to the driving device 14. The original image is formed by a plurality of printing pixels. In this embodiment, the application device 12 may be preferably a word processing software (e.g. Word) or a drawing software (e.g. Coreldraw). The driving device 14 is used for processing the original image transmitted from the application device 12, so as to control the printing device 16 to print. The driving device 14 may be preferably a printer driving software. As shown in FIG. 1, the driving device 14 includes an edge detecting unit 18, a printing-dot setting unit 20, and an image generating unit 22. The edge detecting unit 18 is used for detecting an edge of the original image. The printing-dot setting unit 20 is used for setting the plurality of printing pixels as a plurality of first printing dots and setting a plurality of second printing dots according to a plurality of neighboring pixels corresponding to the edge detected by the edge detecting unit 18. The image generating unit 22 is used for generating an image to be printed according to the plurality of first printing dots and the plurality of second printing dots. The printing device 16 is used for printing the image to be printed. In this embodiment, the printing device 16 may be preferably a printer or a multi-function printer compatible to the driving device 14.

Figure 2:
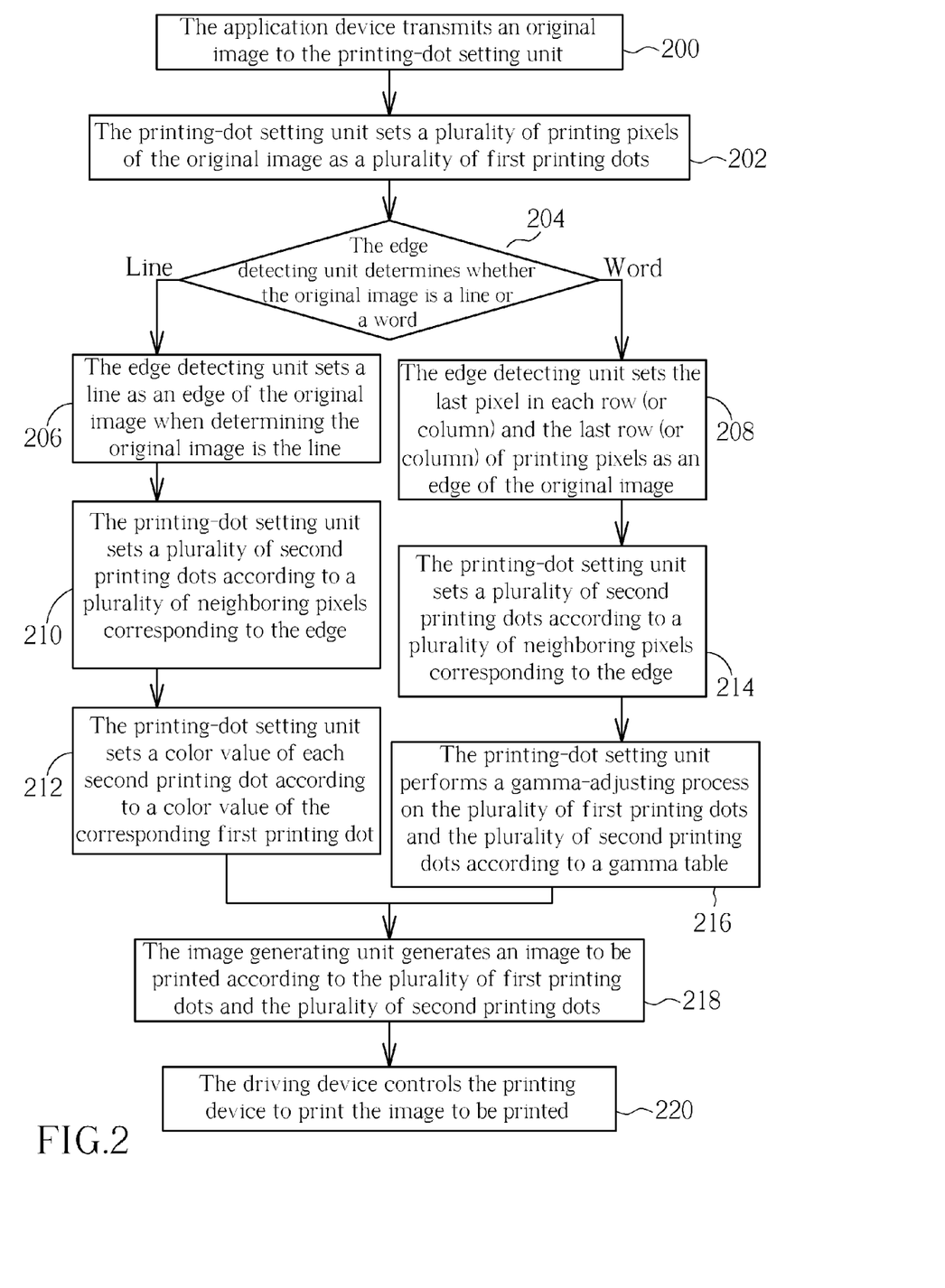
FIG. 2 is a flowchart of a method for utilizing the printing system in FIG. 1 to add printing dots.

Please refer to FIG. 2, which is a flowchart of a method for utilizing the printing system 10 in FIG. 1 to add printing dots.

The steps of the method are described in detail as follows. First, in Step 200, when a user operates the application device 12 to perform printing of an original image, the application device 12 transmits the original image to the driving device 14 for subsequent printing processes. After the printing device 14 receives the original image transmitted from the application device 12, the printing-dot setting unit 20 in the driving device 14 may set the plurality of printing pixels as the plurality of first printing dots (Step 202). At the same time, the edge detecting unit 18 may determine if the original image is a line formed via a line drawing API (Application Programming Interface) in the driving device 14 called by the application device 12 or a word formed via a word drawing API in the driving device 14 called by the application device 12 (Step 204). When the edge detecting unit 18 determines that the original image is a line, the edge detecting unit 18 may set the line as an edge of the original image (Step 206), and the printing-dot setting unit 20 may set the plurality of second printing dots according to the plurality of neighboring pixels corresponding to the edge (Step 210).

It should be mentioned that the said edge detection of the original image and setting of the plurality of second printing dots may vary with the property of the line. In the following, more detailed description for Step 206 and Step 210 is provided on premise that the original image is a horizontal line, a vertical line or an oblique line.

Figure 3:
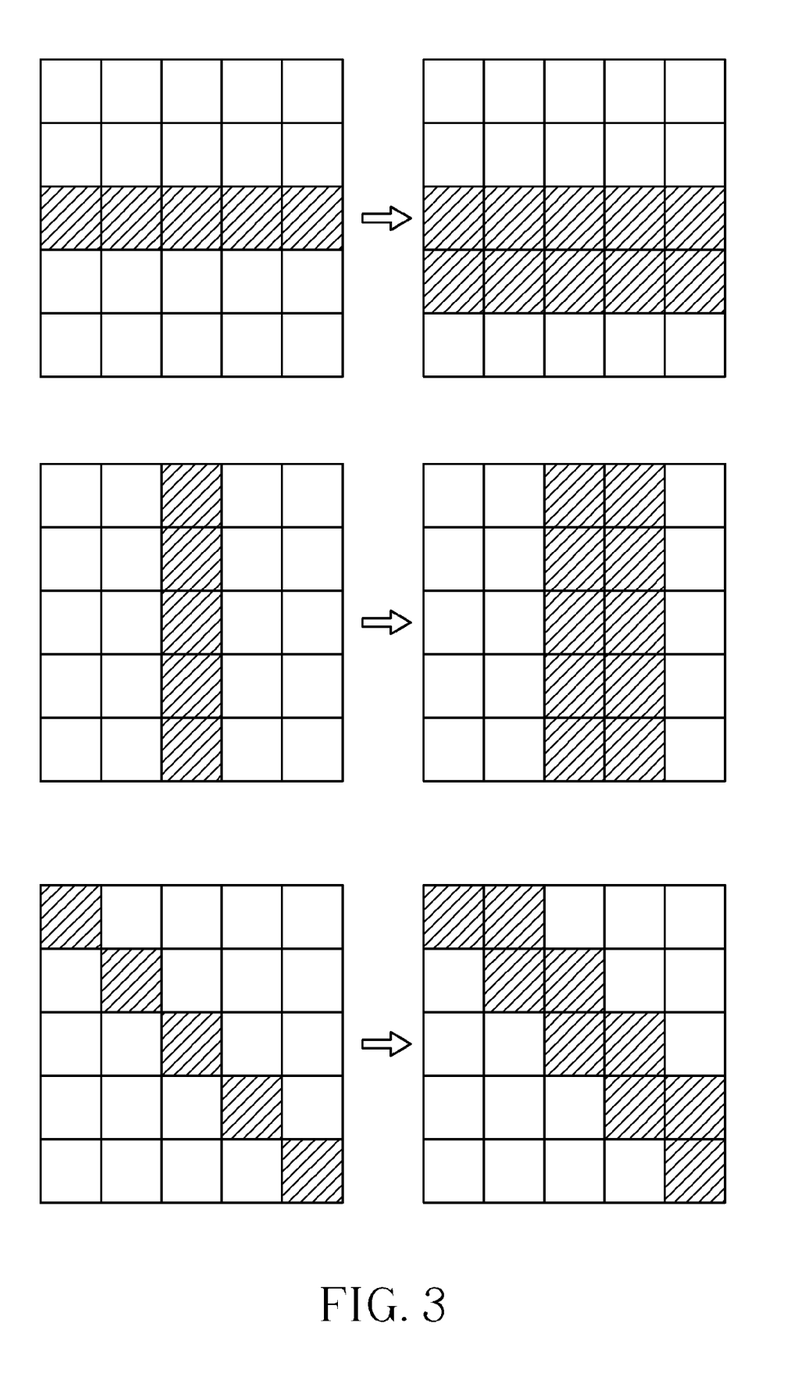
FIG. 3 is a comparison diagram of a horizontal line, a vertical line and an oblique line after performing a process of adding printing dots according to the present invention.

Please refer to FIG. 3, which is a comparison diagram of a horizontal line, a vertical line and an oblique line after performing a process of adding printing dots according to the present invention. As shown in the images at the left side of FIG. 3, before the process of adding printing dots according to the present invention has been not performed on the original image yet, the original image is a horizontal line formed by one single row of printing pixels, a vertical line formed by one single column of printing pixels, or an oblique line. At this time, the edge detecting unit 18 may directly set the horizontal line, the vertical line, or the oblique line as the edge of the original image. That is, if the original image is the horizontal line or the vertical line, the printing-dot setting unit 20 may preferably set a next row or a next column of pixels relative to the plurality of printing pixels as the plurality of second printing dots. If the original image is the oblique line, the printing-dot setting unit 20 may set a pixel in a next column relative to each printing pixel as the corresponding neighboring pixel and set each neighboring pixel as the corresponding second printing dot respectively, so as to cause an additional line to be printed on the upper side of the oblique line (as shown in the down-right image of FIG. 3).

In brief, no matter the original image is a horizontal line, a vertical line, or an oblique line, the driving device 14 is capable of generating the plurality of second printing dots correspondingly according to the aforementioned determining principle. The present invention may also utilize other method capable of achieving the same purpose instead. For example, if the original image is the horizontal line, the printing-dot setting unit 20 may set a former row of pixels relative to the horizontal line as the second printing dots, so as to cause an additional line to be printed on the upper of the horizontal line. If the original image is the vertical line, the printing-dot setting unit 20 may set a former column of pixels relative to the vertical line as the second printing dots, so as to cause an additional line to be printed on the left of the vertical line. If the original image is the oblique line, the printing-dot setting unit 20 may set a pixel in a next row relative to each printing pixel as the corresponding neighboring pixel and set each neighboring pixel as the corresponding second printing dot respectively, so as to cause an additional line to be printed on the bottom side of the oblique line. As for which method is utilized, it may depend on the practical application of the printing system 10.

Next, after completing setting of the plurality of second printing dots, the printing-dot setting unit 20 may set a color value of each second printing dot according to a color value of the corresponding first printing dot (Step 212). For example, the printing-dot setting unit 20 can set a color value of each second printing dot to be equal to that of the corresponding first printing dot.

After completing setting of the plurality of first printing dots and the plurality of second printing dots, the image generating unit 22 may generate a corresponding image to be printed according to the plurality of first printing dots and the plurality of second printing dots (Step 218). Finally, in Step 220, the driving device 14 may control the printing device 16 to print the image to be printed, which is formed by the plurality of first printing dots and the plurality of second printing dots, so as to achieve the purpose of increasing the printing width of the original image. In summary, via additionally printing an identical line at a side of an original line, the printing width of the line printed by the printing device 16 may be increased, meaning that the line can be printed more clearly and continuously by the printing device 16. Thus, the printing quality of the printing device 16 in line printing is improved accordingly.

Figure 4:
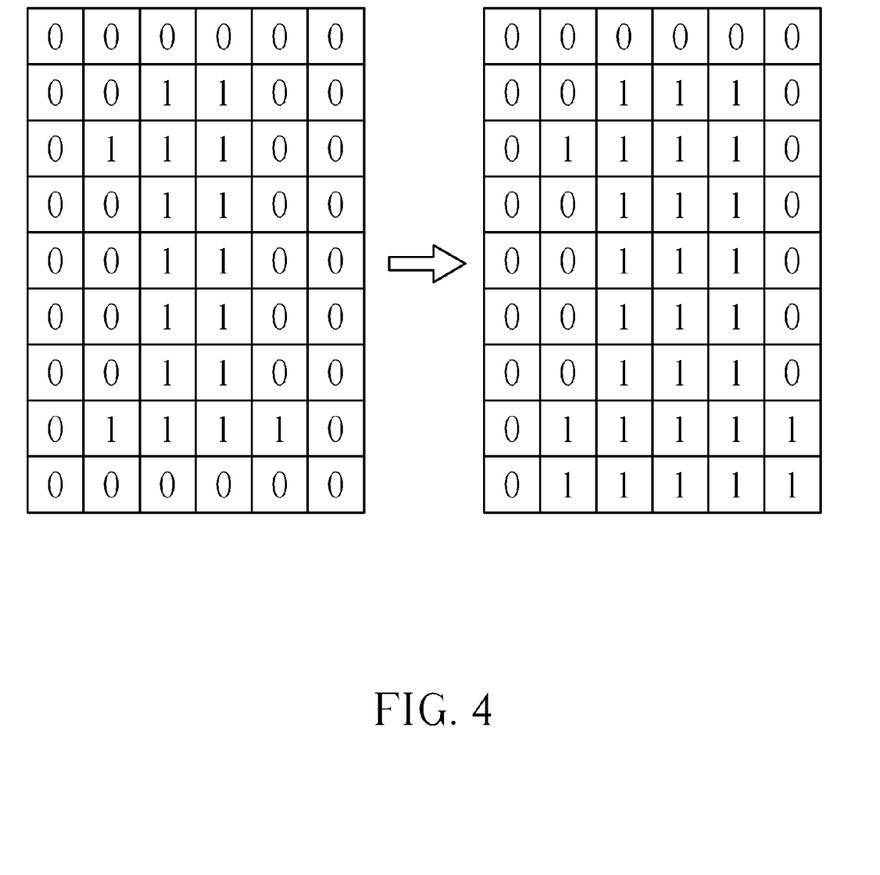
FIG. 4 is a comparison diagram of a word after performing a process of adding printing dots according to the present invention.

Next, please refer to FIG. 2 again. On the other hand, when the edge detecting unit 18 determines that the original image is a word formed via the word drawing API of the driving device 14 called by the application device 12, the edge detecting unit 18 may set the last printing pixel in each row (or column) of the original image and the last row (or column) of printing pixels of the original image as the edge of the original image (Step 208), and the printing-dot setting unit 20 may set the plurality of second printing dots according to the plurality of neighboring pixels corresponding to the edge (Step 214). For example, please refer to FIG. 4, which is a comparison diagram of a word after performing a process of adding printing dots according to the present invention. As shown in the left image of FIG. 4, the application device 12 utilizes a matrix of 0's and 1's to form the shape of the word "1" (i.e. the original image), wherein the 0's represent dots not to be printed and the 1's represent dots to be printed (i.e. the first printing dots). Furthermore, the application device 12 simultaneously transmits a printing color value corresponding to the word to the driving device 14. Subsequently, in this embodiment, the edge detecting unit 18 may set the last printing pixel in each row of the original image and the last row of printing pixels of the original image as the edge of the original image, and then the printing-dot setting unit 20 may set the plurality of neighboring pixels corresponding to the edge as the plurality of second printing dots. That is, the printing-dot setting unit 20 may change the value of each neighboring pixel from 0 to 1 (as shown in the right image of FIG. 4). In such a manner, the word size of the original image can be increased accordingly.

Figure 5:
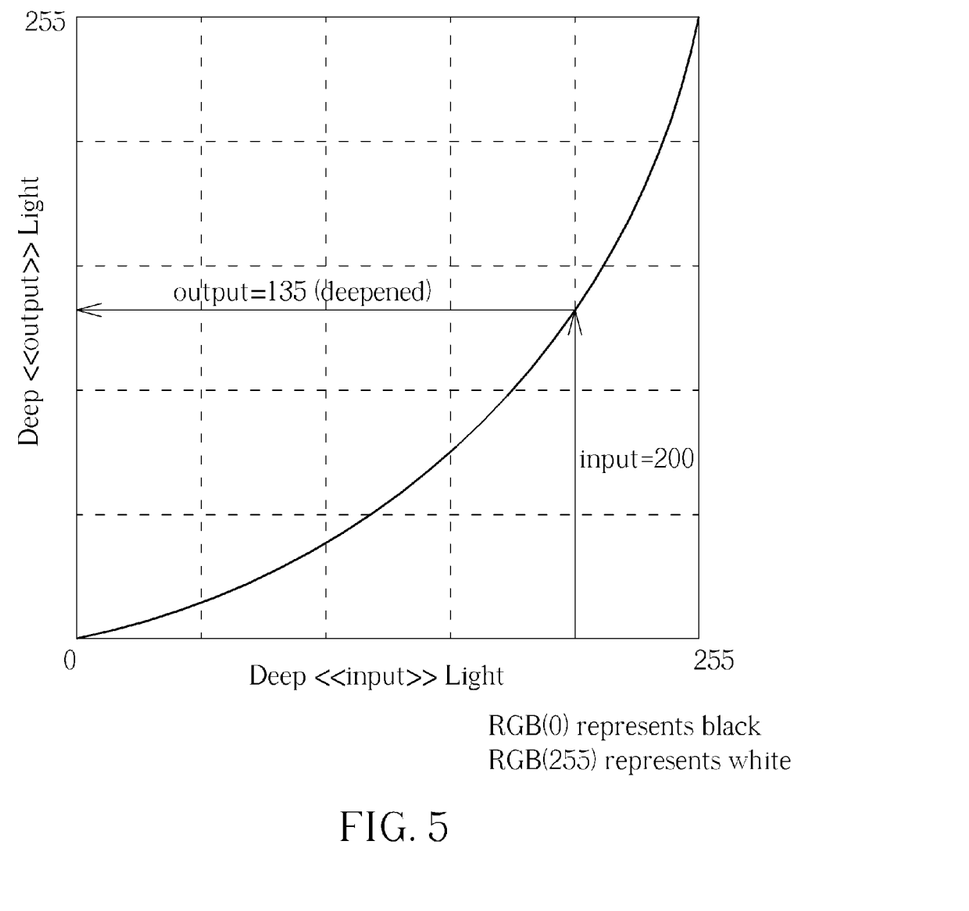
FIG. 5 is a diagram of a gamma table according to a preferred embodiment of the present invention.

After completing the step of adding the plurality of second printing dots, the printing-dot setting unit 20 may perform a gamma-adjusting process on the plurality of first printing dots and the plurality of second printing dots according to a gamma table (Step 216). More detailed description for the gamma table is as shown in FIG. 5, which is a diagram of a gamma table according to a preferred embodiment of the present invention. As shown in FIG. 5, the gamma table is an I/O curve chart, wherein the smaller value represents the deeper color. When the gamma value of the gamma table is less than 1, the output value is greater than the input value, so that the printing color of the original image is deepened accordingly. On other hand, when the gamma value of the gamma table is greater than 1, the output value is less than the input value, so that the printing color of the original image is weakened. In this embodiment, the printing system 10 preferably utilizes a gamma table that its gamma value is equal to 0.6, so as to achieve the purpose of deepening the printing color of the original image. For example, if the input value is 200, the output value may be changed to 135 as shown in FIG. 5 so that the printing color of the original image may be deepened accordingly.

Similarly, after completing setting of the first printing dots and the second printing dots, the image generating unit 22 may generate an image to be printed according to the first printing dots and the second printing dots. Subsequently, in Step 220, the driving device 14 may control the printing device 16 to print the image to be printed.

In summary, via a method for adding additional printing dots at the right side and the bottom side of the original image, the printing size of the original image is enlarged, meaning that the word can be printed more clearly by the printing device 16. Thus, the printing quality of the printing system 10 is improved accordingly.

It should be mentioned that adding of printing dots is not limited to the right side and the bottom side of the original image. For example, the said additional printing dots may be added at the left side and the upper side of the original image instead. That is, all methods for adding additional printing dots at a side of an original image may fall within the scope of the present invention. As for which method is utilized, it may depend on the practical application of the printing system 10. Furthermore, the present invention may also utilize other gamma table for meeting different printing needs of the printing system 10, such as utilizing a gamma table that its gamma value is greater than 1 instead to weaken the printing color of the original image for toner saving.

Figure 6:
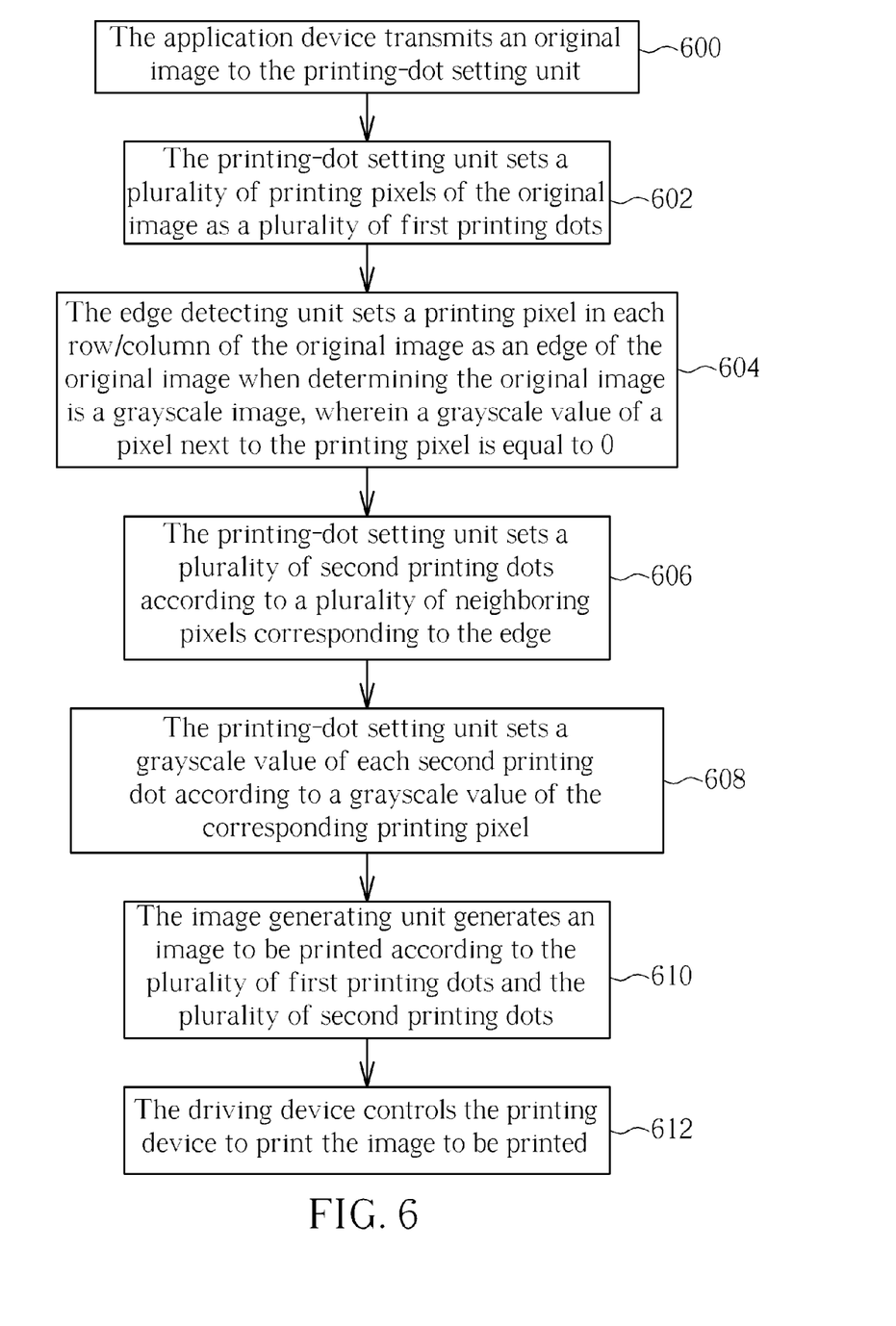
FIG. 6 is a flowchart of a method for adding printing dots by utilizing the printing system in FIG. 1 according to another preferred embodiment of the present invention.

Please refer to FIG. 6, which is a flowchart of a method for adding printing dots by utilizing the printing system 10 in FIG. 1 according to another preferred embodiment of the present invention. The method includes the following steps.

Step 600: The application device 12 transmits an original image to the printing-dot setting unit 20;

Step 602: The printing-dot setting unit 20 sets a plurality of printing pixels of the original image as a plurality of first printing dots;

Step 604: The edge detecting unit 18 sets a printing pixel in each row/column of the original image as an edge of the original image when determining the original image is a grayscale image, wherein a grayscale value of a pixel next to the printing pixel is equal to 0;

Step 606: The printing-dot setting unit 20 sets a plurality of second printing dots according to a plurality of neighboring pixels corresponding to the edge;

Step 608: The printing-dot setting unit 20 sets a grayscale value of each second printing dot according to a grayscale value of the corresponding printing pixel;

Step 610: The image generating unit 22 generates an image to be printed according to the plurality of first printing dots and the plurality of second printing dots;

Step 612: The driving device 14 drives the printing device 16 to print the image to be printed.

As shown in FIG. 2 and FIG. 6, the major difference between this embodiment and the said embodiments is Step 604 and Step 608. In the following, more detailed description for the Step 604 and Step 608 is provided. As for other steps, the related description is omitted herein since they are the same as those mentioned in the said embodiment. When the original image is a grayscale image, the driving device 14 may receive the grayscale image pre-processed by the application device 12 directly without performing the step of the application device 12 calling the line-drawing API or the word-drawing API of the driving device 14, even if the original image includes lines or words.

Figure 7:
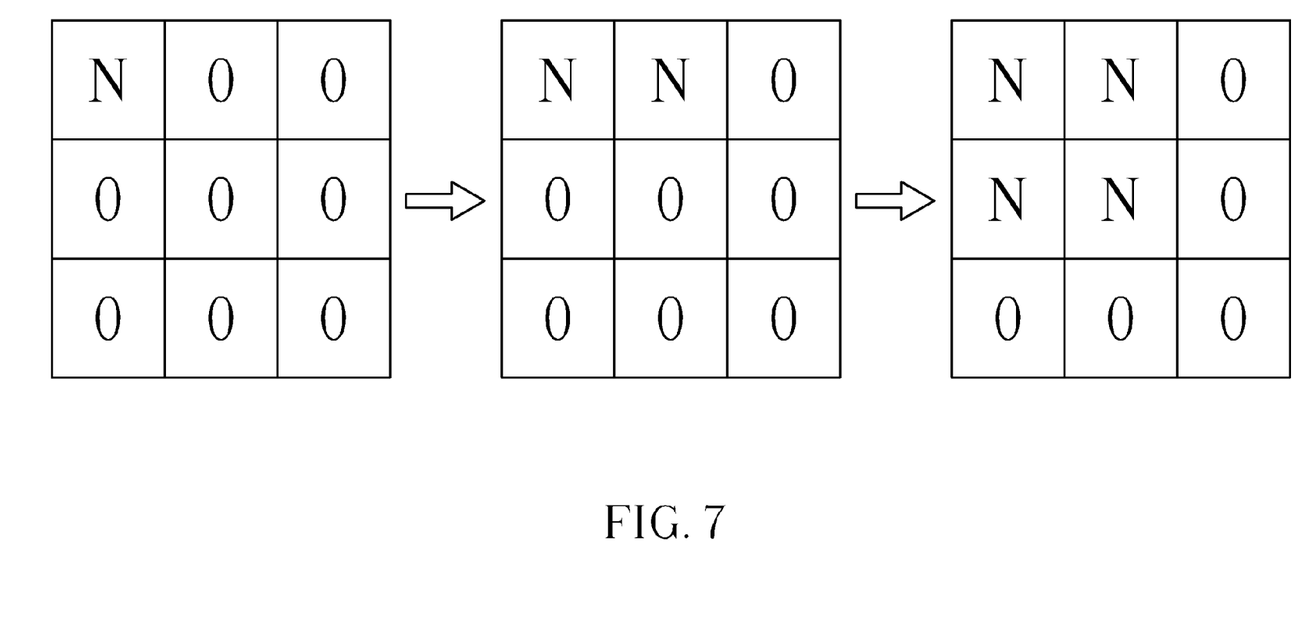
FIG. 7 is a partial comparison diagram of a grayscale image after performing a process of adding printing dots according to the present invention.

After the application device 12 transmits the original image to the printing-dot setting unit 20 (Step 600) and the printing-dot setting unit 20 sets the plurality of printing pixels as the plurality of first printing dots (Step 602), the edge detecting unit 18 may set a printing pixel in each row (i.e. a horizontal scanning)/column (i.e. a vertical scanning) of the original image as the edge of the original image when determining the original image is a grayscale image (Step 604), wherein a grayscale value of a pixel next to the printing pixel is equal to 0. Subsequently, the printing-dot setting unit 20 may set the plurality of second printing dots according to the plurality of neighboring pixels corresponding to the edge (Step 606), and set a grayscale value of each second printing dot according to a grayscale value of the corresponding printing pixel (Step 608). The related description for the said scanning process may be as shown in FIG. 7, which is a partial comparison diagram of a grayscale image after performing a process of adding printing dots according to the present invention. The left image of FIG. 7 is a diagram of one image edge in the original image, wherein N represents a grayscale value of the said printing pixel (i.e. the first printing dot). First, the edge detecting unit 18 may perform the said horizontal scanning on the original image. When the edge detecting unit 18 scans to the said first printing dot located at the upper-left corner of the left image in FIG. 7, the edge detecting unit 18 may determine the first printing dot as the edge of the original image since a grayscale value of a pixel next to the first printing dot is equal to 0, and then determine the said pixel as the corresponding neighboring pixel. As shown in Step 606 and Step 608, the printing-dot setting unit 20 may set the said neighboring pixel as a second printing dot with a grayscale value being equal to N (As shown in the middle image of FIG. 7).

After finishing the said horizontal scanning, the edge detecting unit 18 may perform the said vertical scanning on the original image. When the edge detecting unit 18 scans to the said first printing dot located at the upper-left corner of the middle image in FIG. 7, the edge detecting unit 18 may also determine the first printing dot as the edge of the original image since a grayscale value of a pixel next to the first printing dot is equal to 0, and determine the said pixel as the corresponding neighboring pixel and then set the said neighboring pixel as a second printing dot with a grayscale value being equal to N (as shown in the right image of FIG. 7). Similarly, when the edge detecting unit 18 scans to the said second printing dot located at the middle of the middle image in FIG. 7, the edge detecting unit 18 may determine the second printing dot as the edge of the original image since a grayscale value of a pixel next to the second printing pixel is equal to 0, and determine the said pixel as the corresponding neighboring pixel and then set the said neighboring pixel as a second printing dot with a grayscale value being equal to N (as shown in the right image of FIG. 7).

In summary, via the said process of adding additional printing dots, the edge of the original image may have four printing dots as shown in the right image of FIG. 7 instead of having only one single printing dot as shown in the left image of FIG. 7. Similarly, the process of adding additional printing dots may also be applied to other edges in the original image determined by the edge detecting unit 18 according to the said edge determining principle.

Next, as mentioned above, after completing setting of the plurality of first printing dots and the plurality of second printing dots, the image generating unit 22 may generate the image to be printed according to the plurality of first printing dots and plurality of second printing dots (Step 610), and then the driving device 14 may control the printing device 16 to print the image to be printed (Step 612). In such a manner, via a method for adding additional printing dots at the right side and the bottom side of the edge of the original image, the edge of the image to be printed may be printed more clearly so as to improve the printing quality of the printing system 10. It should be mentioned that adding of printing dots is not limited to the right side and the bottom side of the edge of the original image. For example, the said additional printing dots may be added at the left side and the upper side of the edge of the original image instead. That is, all methods for adding additional printing dots at a side of an edge of an original image may fall within the scope of the present invention. As for which method is utilized, it depends on the practical application of the printing system 10.

Compared with the prior art, in which the problem of discontinuous lines or obscure edges may occur when a printing device prints a line formed by one single column (or row) of pixels or a word of a small size, the present invention utilizes a method for adding additional printing dots at an edge of an original image instead, such as printing an identical line at a side of an original line or adding additional printing dots at an edge of a word. In such a manner, images can be printed more clearly and continuously by a printing device based on the present invention. Thus, the problem of discontinuous lines or obscure edges can be prevented accordingly so as to improve printing quality of the printing device in image printing. Furthermore, since the present invention improves the printing quality of the printing device by utilizing a software-setting method instead of modifying hardware setting in the printing device, the operating life and stability of the printing device is not influenced.

Those skilled in the art will readily observe that numerous modifications and alterations of the device and method may be made while retaining the teachings of the invention.

What is claimed is:

1. A method for improving printing quality using a printer wherein the method comprises:
    an application device transmitting an original image comprising a plurality of printing pixels to a driving device;
    the driving device setting the plurality of printing pixels as a plurality of first printing dots;
    the driving device detecting an edge of the original image;
    the driving device setting a plurality of second printing dots according to a plurality of neighboring pixels corresponding to the edge;
    and the driving device generating an image to be printed according to the plurality of first printing dots and the plurality of second printing dots;
    wherein the driving device detecting the edge of the original image comprises:
    the driving device setting a printing pixel in each row of the original image as the edge of the original image when determining the original image is a grayscale image, and a grayscale value of a pixel next to the printing pixel being equal to 0;
    the driving device setting a printing pixel in each column of the original image as the edge of the original image when determining the original image is a grayscale image, and a grayscale value of a pixel next to the printing pixel being equal to 0;
    and determining the plurality of printing pixels forms a line via a line drawing API (Application Programming Interface) called by the application device.

2. The method of claim 1 further comprising: the driving device driving a printing device to print the image to be printed.

3. The method of claim 1, wherein the driving device detecting the edge of the original image comprises: when determining the plurality of printing pixels forms a line via a line drawing API (Application Programming Interface) called by the application device, the driving device setting the line as the edge.

4. The method of claim 3, wherein the driving device setting the plurality of second printing dots according to the plurality of neighboring pixels corresponding to the edge comprises: when the line is a horizontal line, the driving device setting a next row of pixels corresponding to the plurality of printing pixels as the plurality of neighboring pixels.

5. The method of claim 3, wherein the driving device setting the plurality of second printing dots according to the plurality of neighboring pixels corresponding to the edge comprises: when the line is a vertical line, the driving device setting a next column of pixels corresponding to the plurality of printing pixels as the plurality of neighboring pixels.

6. The method of claim 3, wherein the driving device setting the plurality of second printing dots according to the plurality of neighboring pixels corresponding to the edge comprises: when the line is an oblique line, the driving device setting a pixel next to each printing pixel as the neighboring pixel.

7. The method of claim 3 further comprising: the driving device setting a color value of each second printing dot according to a color value of the corresponding first printing dot.

8. The method of claim 1, wherein the driving device detecting the edge of the original image comprises: when determining the plurality of printing pixels forms a word via a word drawing API called by the application device, the driving device setting the last printing pixel in each row of the original image as the edge of the original image, and the driving device setting the last row of printing pixels in the original image as the edge of the original image.

9. The method of claim 8 further comprising: the driving device performing a gamma-adjusting process on the image to be printed according to a gamma table.

10. The method of claim 1, wherein the driving device setting the plurality of second printing dots according to the plurality of neighboring pixels corresponding to the edge comprises: the driving device setting a grayscale value of each second printing dot according to a grayscale value of the corresponding printing pixel in each row of the original image.

11. The method of claim 1, wherein the driving device setting the plurality of second printing dots according to the plurality of neighboring pixels corresponding to the edge comprises: the driving device setting a grayscale value of each second printing dot according to a grayscale value of the corresponding printing pixel in each column of the original image.

12. A printing system for improving printing quality, the printing system comprising:
    an application device for transmitting an original image, the original image being formed by a plurality of printing pixels;
    a driving device for processing the original image, the driving device comprising:
    an edge detecting unit for detecting an edge of the original image;
    a printing-dot setting unit for setting the plurality of printing pixels as a plurality of first printing dots and setting a plurality of second printing dots according to a plurality of neighboring pixels corresponding to the edge;

and an image generating unit for generating an image to be printed according to the plurality of first printing dots and the plurality of second printing dots;

and a printing device for printing the image to be printed;

wherein the edge detecting unit is used for setting a printing pixel in each row of the original image as the edge when determining the original image is a grayscale image, and a grayscale value of a pixel next to the printing pixel is equal to 0;

wherein the edge detecting unit is used for setting a printing pixel in each column of the original image as the edge when determining the original image is a grayscale image, and a grayscale value of a pixel next to the printing pixel is equal to 0;

wherein the edge detecting unit determines the plurality of printing pixels forms a line via a line drawing API (Application Programming Interface) called by the application device.

13. The printing system of claim 12, wherein the edge detecting unit is used for setting a line as the edge when determining the plurality of printing pixels forms the line via a line drawing API called by the application device.

14. The printing system of claim 13, wherein the printing-dot setting unit is used for setting a next row of pixels corresponding to the plurality of printing pixels as the plurality of neighboring pixels when the line is a horizontal line.

15. The printing system of claim 13, wherein the printing-dot setting unit is used for setting a next column of pixels corresponding to the plurality of printing pixels as the plurality of neighboring pixels when the line is a vertical line.

16. The printing system of claim 13, wherein the printing-dot setting unit is used for setting a pixel next to each printing pixel as the neighboring pixel when the line is an oblique line.

17. The printing system of claim 13, wherein the printing-dot setting unit is used for setting a color value of each second printing dot according to a color value of the corresponding first printing dot.

18. The printing system of claim 12, wherein the edge detecting unit is used for setting the last printing pixel in each row of the original image and the last row of printing pixels in the original image as the edge of the original image when determining the plurality of printing pixels forms a word via a word drawing API called by the application device.

19. The printing system of claim 18, wherein the printing-dot setting unit is used for performing a gamma-adjusting process on the plurality of first printing dots and the plurality of second printing dots according to a gamma table.

20. The printing system of claim 12, wherein the printing-dot setting unit is used for setting a grayscale value of each neighboring pixel according to a grayscale value of the corresponding printing pixel in each row of the original image.

21. The printing system of claim 12, wherein the printing-dot setting unit is used for setting a grayscale value of each neighboring pixel according to a grayscale value of the corresponding printing pixel in each column of the original image.

* * * * *